May 24, 1927.
E. F. BOSSUNG
1,629,773
KNOB
Filed Oct. 17, 1925
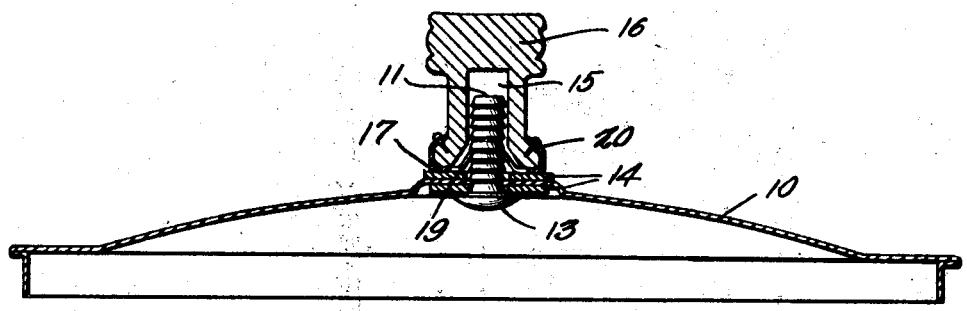
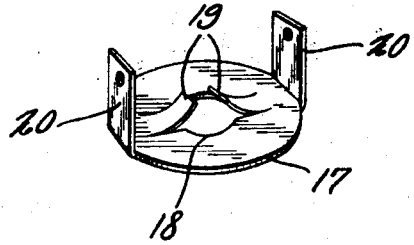
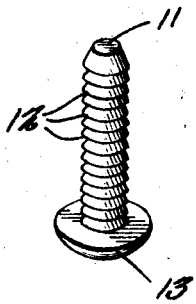
Ernst F. Bossung,
INVENTOR
BY Victor J. Evans
ATTORNEY
WITNESS:

Patented May 24, 1927.

1,629,773

UNITED STATES PATENT OFFICE.

ERNST F. BOSSUNG, OF HAMILTON, OHIO.

KNOB.

Application filed October 17, 1925. Serial No. 63,152.

This invention relates to improvements in knobs for use upon culinary vessel lids, panels and doors.

Another object of my invention resides in the provision of a locking means for the shank in retaining the knob whereby the knob may not become accidentally displaced from the object to which the same is applied.

With the above and other objects in view, the invention further includes the following novel features and details of construction to be hereinafter more fully described, illustrated in the accompanying drawing and pointed out in the appended claim.

In the drawing:—

Figure 1 is a transverse section taken through my knob when so applied upon a culinary vessel lid.

Figure 2 is a perspective of the locking means.

Figure 3 is a perspective of the shank to be locked within the knob.

Referring to the drawing in detail, wherein like characters of reference denote corresponding parts, the reference character 10 indicates a culinary vessel lid being of the usual and well known construction and forming no part of the present invention for Letters Patent, but being merely for purposes of illustration in bringing forward the novel advantages of the above entitled invention.

The invention resides in the provision of a shank 11 constituting a plurality of frusto-conical shaped members 12 arranged from end to end and providing a head 13 upon one end, this shank 11 extending through an opening disposed centrally of the lid 10 and within washers 14 upon the under and upper sides thereof and extending an appreciable distance within a bore 15 provided within a knob 16.

In order to provide means for rigidly locking the shank 11 within the bore 15 of a knob 16, I provide an auxiliary disk 17 arranged upon the upper side of the uppermost of the washers 14 and having an opening 18 for the reception of the shank 11 therein, while spring lugs 19 struck from the washer 17 extend inwardly an appreciable distance within the opening 18 of the washer 17, whereby the frusto-conical shaped portions 12 constituting the shank 11 are held rigidly in biting engagement with the spring lugs 19. Formed upon the periphery and upon diametrically opposite sides of the washer 17 are apertured ears 20 capable of being bent upon themselves and secured to the lower side of the knob 16 after the shank 11 has been arranged in biting engagement with the spring lugs 19.

It will thus be noted from the foregoing description and accompanying drawing that the shank 11 may be rigidly locked within the knob 16 and permitting the knob 16 to be turned or rotated as desired.

The invention is susceptible of various changes in its form, proportions and minor details of construction, and the right is herein reserved to make such changes as properly fall within the scope of the appended claim.

Having thus described my invention, what I claim is:—

A knob attachment for use upon pan tops having a bore extending within one end thereof, a shank forming a plurality of frusto-conical shaped members disposed in end to end relation and extended through the top and within said bore, a disk member seated upon the top below the knob, attaching ears carried by the disk and secured to the knob, and spring lugs struck centrally and extending upwardly from the disk within the bore for engagement with the frusto-conical shaped portions of the shank.

In testimony whereof I affix my signature.

ERNST F. BOSSUNG.